(12) United States Patent
Sankaran et al.

(10) Patent No.: US 8,668,272 B2
(45) Date of Patent: Mar. 11, 2014

(54) VEHICLE SEAT

(75) Inventors: Nandakumar Sankaran, Northville, MI (US); Elizabeth Ann Allen, Ypsilanti, MI (US); Robert Michael Heilman, Ann Arbor, MI (US)

(73) Assignee: Johnson Controls Technology Company, Holland, MI (US)

( * ) Notice: Subject to any disclaimer, the term of this patent is extended or adjusted under 35 U.S.C. 154(b) by 484 days.

(21) Appl. No.: 12/921,826

(22) PCT Filed: Mar. 12, 2009

(86) PCT No.: PCT/US2009/036897
§ 371 (c)(1),
(2), (4) Date: Sep. 10, 2010

(87) PCT Pub. No.: WO2009/114660
PCT Pub. Date: Sep. 17, 2009

(65) Prior Publication Data
US 2011/0006575 A1    Jan. 13, 2011

Related U.S. Application Data

(60) Provisional application No. 61/036,036, filed on Mar. 12, 2008.

(51) Int. Cl.
*A47C 7/02* (2006.01)
(52) U.S. Cl.
USPC ................ 297/452.18; 297/354.1; 297/284.7
(58) Field of Classification Search
USPC ......... 297/452.18, 463.2, 440.21, 354.1, 362, 297/369, 284, 217.3, 284.1, 284.4, 284.7, 297/302.1; 248/424, 425, 429, 430, 420, 248/422, 423, 371
See application file for complete search history.

(56) References Cited

U.S. PATENT DOCUMENTS 4,943,196 A    7/1990    Dahl
4,961,559 A    10/1990   Raymor
5,564,785 A    10/1996   Schultz et al.
(Continued)

FOREIGN PATENT DOCUMENTS

EP    0911209 A3    4/1999
JP    8-182567      7/1996
JP    2003-93185    4/2003

OTHER PUBLICATIONS

Patent Treaty Cooperation, International Search Report and Written Opinion of the International Searching Authority, PCT/US2009/036897, Sep. 23, 2010.

*Primary Examiner* — Tan Le
(74) *Attorney, Agent, or Firm* — Butzel Long (57) ABSTRACT

A vehicle seat (10) includes an improved seat frame member (14) used as a seat back, a recliner mechanism connection (16) and a vehicle seat track actuator mechanism (18). The seat back frame member (14) includes a side frame member (30) having a side frame structural member (32) preferably made from a relatively high strength steel and a stiffening insert member (42) to provide strength and rigidity to the recliner mechanism connection (16) and to reduce the overall mass of the vehicle seat frame member and thereby the vehicle seat (10). The seat frame member (14) further includes a recliner mechanism (34) welded to the side frame structural member (32) preferably utilizing a shaped laser weld pattern (40). The vehicle seat track actuator mechanism (18) includes a bar (56), first and second pivot pins (62, 64) and connectors (70).

11 Claims, 9 Drawing Sheets

(56) References Cited

U.S. PATENT DOCUMENTS

| | | | |
|---|---|---|---|
| 6,158,811 A | 12/2000 | Hofschulte et al. | |
| 6,220,642 B1 | 4/2001 | Ito et al. | |
| 6,336,679 B1 | 1/2002 | Smuk | |
| 6,490,942 B1 | 12/2002 | Meyer | |
| 6,543,855 B2 * | 4/2003 | Bruck | 297/440.21 |
| 7,066,552 B2 * | 6/2006 | Yoshida | 297/452.18 |
| 7,802,852 B2 * | 9/2010 | Siegrist et al. | 297/452.18 |
| 2002/0113472 A1 | 8/2002 | Blendea et al. | |
| 2004/0113481 A1 * | 6/2004 | Saberan et al. | 297/452.18 |
| 2005/0253036 A1 | 11/2005 | Feng | |
| 2008/0265639 A1 * | 10/2008 | Siegrist et al. | 297/217.3 |
| 2009/0072601 A1 * | 3/2009 | Geisler et al. | 297/284.1 |
| 2012/0139315 A1 * | 6/2012 | Yamada et al. | 297/354.1 |
| 2012/0267935 A1 * | 10/2012 | Zekavica et al. | 297/452.18 |

\* cited by examiner

VEHICLE SEAT

CROSS-REFERENCE TO RELATED PATENT APPLICATIONS

This application claims the benefit of and priority to U.S. Provisional Patent Application No. 61/036,036, filed Mar. 12, 2008, titled: VEHICLE SEAT, in the name of Sankaran et al. which is incorporated by reference herein.

BACKGROUND

The present disclosure relates generally to improvements to a seat structure. More particularly the present disclosure relates to improvements relating to a seat frame and process for making the seat frame, a track for adjusting the position of the seat and an actuator for a latch for locking the track in position.

It is generally known to provide adjustable seats and in particular adjustable vehicle seats. Further, it is generally known to provide an adjustable track assembly for adjusting the fore—aft position of the vehicle seat within the vehicle. Such track assemblies are known for use in providing fore-aft adjustment to vehicle seats such a "captain's chair" or other type of vehicle seats. The linear adjustable vehicle seat allows an occupant to obtain a more comfortable seating position and to provide space behind or in front of the vehicle seat to assist in entering and exiting the vehicle. Further, latch mechanisms are generally known for locking the vehicle seat position at a plurality of locations. Further, recliner latch mechanisms are known for providing adjustability to the seat back. Such latch mechanisms are generally known as pawl and positive engagement latch-type devices and mechanisms.

There remains a continuing need to provide improved seats having lower mass and the same strength or even an improved (increased) strength and performance for the above that provide greater performance than compared to the known seats.

SUMMARY

An exemplary embodiment of the present disclosure relates to an improved seat back frame member and recliner mechanism connection. The seat back frame member includes, inter alia, a side frame member having a side frame structural member preferably made from a relatively high strength steel and a stiffening insert member to provide strength and rigidity to the recliner mechanism connection and reduce the mass of the vehicle seat back frame member and thereby the vehicle seat. The seat back frame member further includes a recliner mechanism for providing pivotable adjustment of the seat back of the vehicle seat. The recliner mechanism is welded to the side frame structural member preferably utilizing a C-shaped laser weld pattern to further strengthen the recliner mechanism connection.

According to an alternate embodiment, the seat may include a seat track assembly and a vehicle seat track actuator mechanism. The vehicle seat track actuator mechanism includes, inter alia, a bar, first and second pivot pins and connectors. The connectors are fastened to the distal ends of the first and second pivot pins and secure the pivot pins into holes located on movable track members of the seat track assembly. The vehicle seat track actuator mechanism is designed for operating a latch mechanism to unlock the latch mechanism and release the movable track members so they may move with respect to the base (stationary track members) and thereby move the vehicle seat in the fore and aft directions.

DETAILED DESCRIPTION

Referring generally to FIGS. 1 through 21, a vehicle 10 having a vehicle seat 12 having an improved seat back frame member 14 and recliner mechanism connection 16 and an improved vehicle seat track actuator mechanism 18 are shown according to exemplary embodiments. The improved seat back frame member 14 and recliner mechanism connection 16 are designed to improve the performance of the seat back frame 14 and vehicle seat 12 by increasing the strength of the seat frame 14 and the recliner mechanism connection 16 without unnecessarily increasing the weight of the seat 12. The seat track actuator 18 mechanism is configured for actuating a latch mechanism 20 for selectively controlling the position of the vehicle seat 12 relative to the interior of the vehicle 10. It should be noted that the improved seat back frame member 14 and recliner mechanism connection 16 and an improved vehicle seat track actuator mechanism 18 and methods described herein may be used in a variety of applications and vehicle seat systems (e.g., front seats, second or third row seats, bucket seats, bench seats, etc. for automobiles, trucks, vans, SUVS, trains, airplanes, boats, etc.) and other non-vehicle seat applications wherein it would be desirable to utilize an improved seat back frame member 14 and recliner mechanism connection 16 and an improved vehicle seat track actuator mechanism 18 of the type disclosed herein (e.g., theatre seats, doctors' chairs, etc.).

Figure 1:
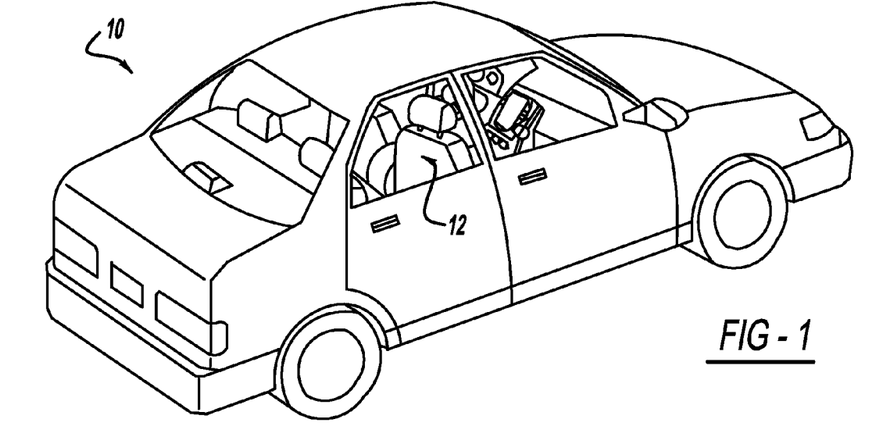
FIG. 1 is a perspective view of a vehicle including a vehicle seat according to an exemplary embodiment.
Figure 2:
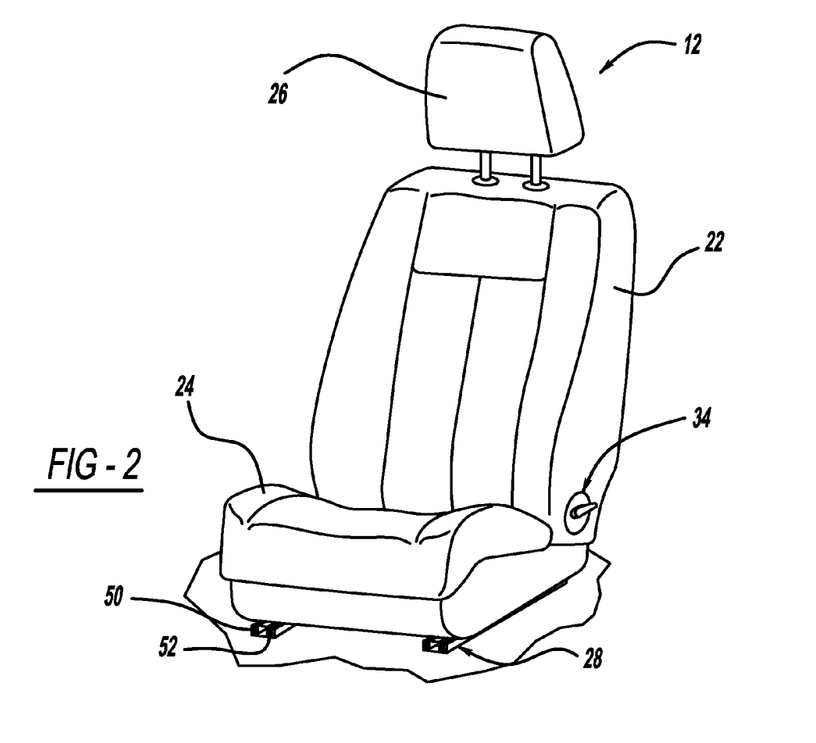
FIG. 2 is a perspective view of a vehicle seat of the vehicle of FIG. 1 according to an exemplary embodiment.

Referring now to FIG. 1, a vehicle 10 is shown according an exemplary embodiment. The vehicle 10 includes one or more vehicle seats 12 provided for an occupant of the vehicle 10. One exemplary embodiment of a vehicle seat structure 12 is shown in FIG. 2. While the vehicle 10 shown is a 4-door sedan, it should be understood that the seat 12 may be used in a mini-van, sport utility vehicle or any other means in or by which someone travels or something is carried or conveyed for any market or application including everything from office seating and transportation to planes and space travel and everything in between. The vehicle seat 12 shown includes a seat back 22, a seat base 24, and a connection member or recliner 16 coupled to the seat back 22 and the seat base 24. The vehicle seat 12 further may include a head restraint 26 and base portion 28. The head restraint 26 extends upward from the seat back 22 and is configured to restrain the head of an occupant during an impact. The base portion (e.g. track assembly) 28 couples the seat 12 to the vehicle body and may be configured to allow the seat 12 to be selectively positioned (manually or motor driven) relative to the vehicle body.

Referring now in particular to FIGS. 1 through 11 there is disclosed a pair of vehicle seat side members 30 having a unique construction. In particular, each side frame member 30 is a mirror image of the other, so the current description will be given for a single side frame member 30. It should be understood that the side frame member 30 is a part of a seat back frame member 14 having a plethora of additional devices, mechanisms and items added to the seat back frame 14 including an upper (and possibly lower) cross frame members, a suspension member, a foam cushion and a seat cover, none of which are currently shown in the FIGURES.

The side frame member 30 includes a side frame structural member 32 as is generally known. The side frame structural member 32 is generally flat, formed (commonly stamped but may be produced using any known or appropriate forming process) metallic member. The side frame structural member 32 is preferably made from relatively high-strength steel appropriate for the intended application of a vehicle seat 12. The side frame member further preferably includes a recliner mechanism 34 for providing pivotable adjustment of the seat back 22 of the vehicle seat 12.

Figure 3A:
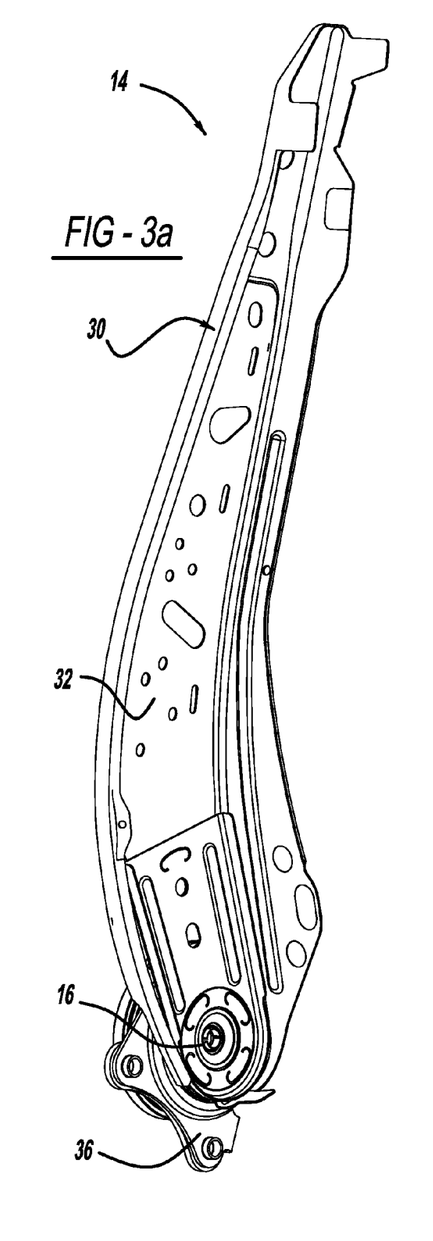
FIG. 3 is a perspective view of the side, seat back frame members of the seat back frame of the vehicle seat of FIG. 2 according to an exemplary embodiment.
Figure 3B:
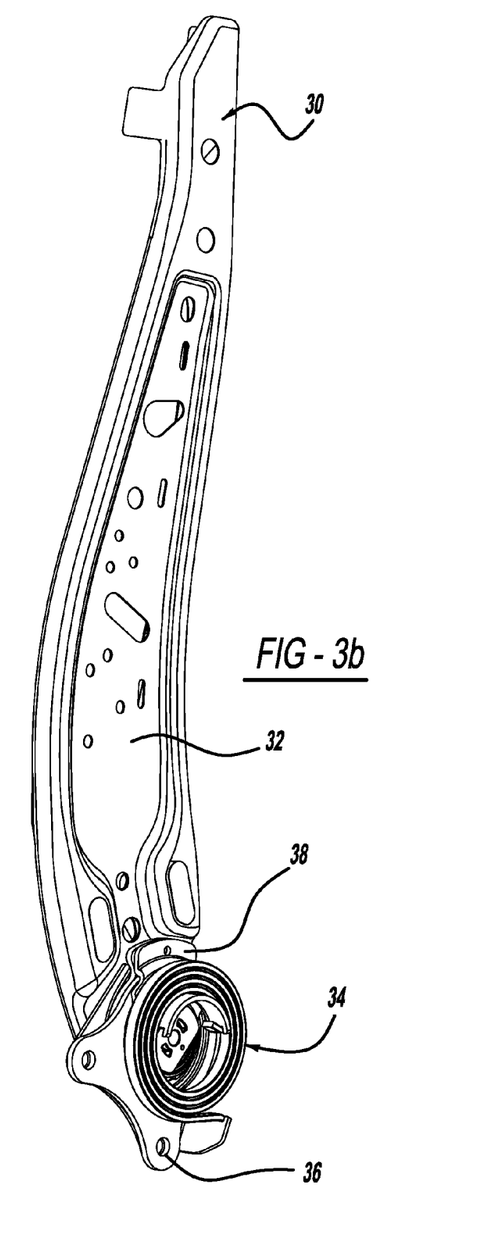
Figure 4:
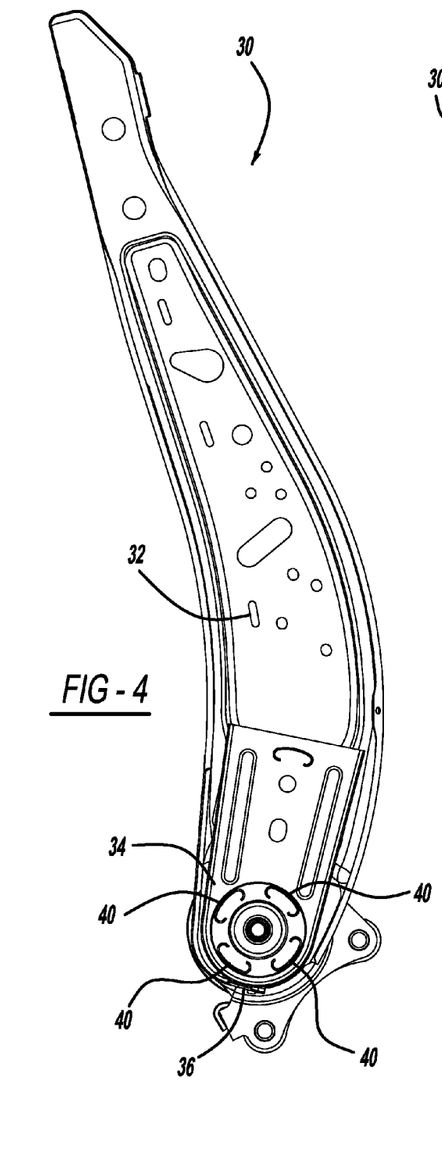
FIG. 4 is a side view of one of the side, seat back frame members of the seat back frame of the vehicle seat of FIG. 2 according to an exemplary embodiment.
Figure 5:
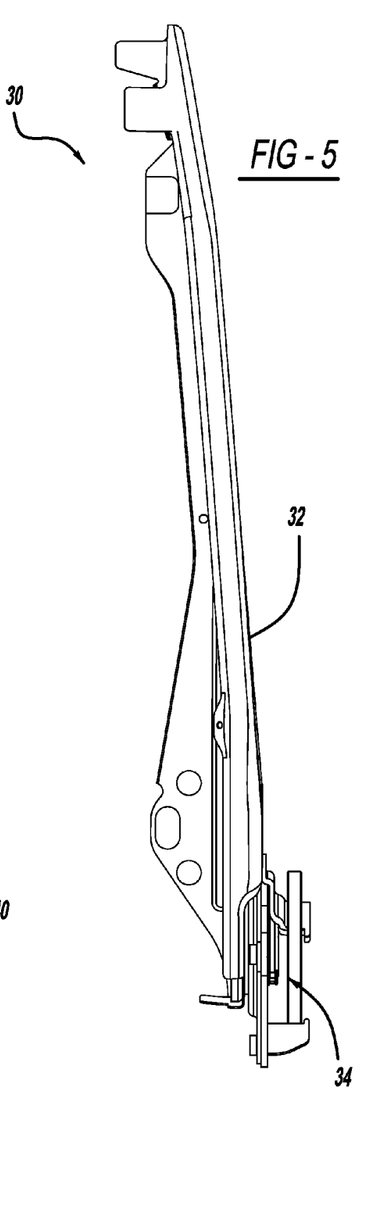
FIG. 5 is a second, side view of the side, seat back frame member of the seat back frame of the vehicle seat of FIG. 4 according to an exemplary embodiment.
Figures 6, 7:
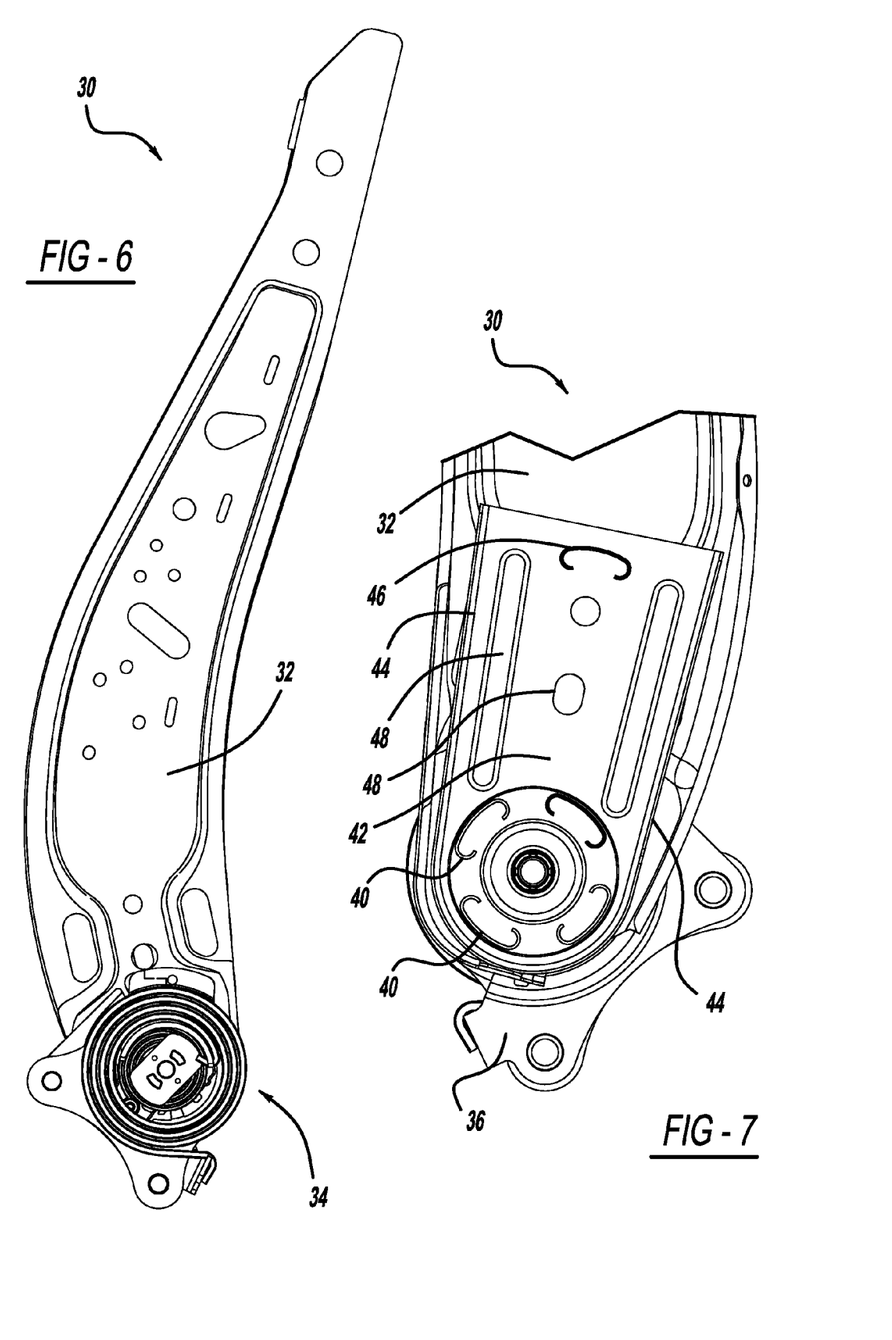
FIG. 6 is a third, side view of the side, seat back frame member of the seat back frame of the vehicle seat of FIG. 4 according to an exemplary embodiment.
FIG. 7 is a partial view of the side, seat back frame member of FIG. 4 according to an exemplary embodiment.
Figures 8, 9:
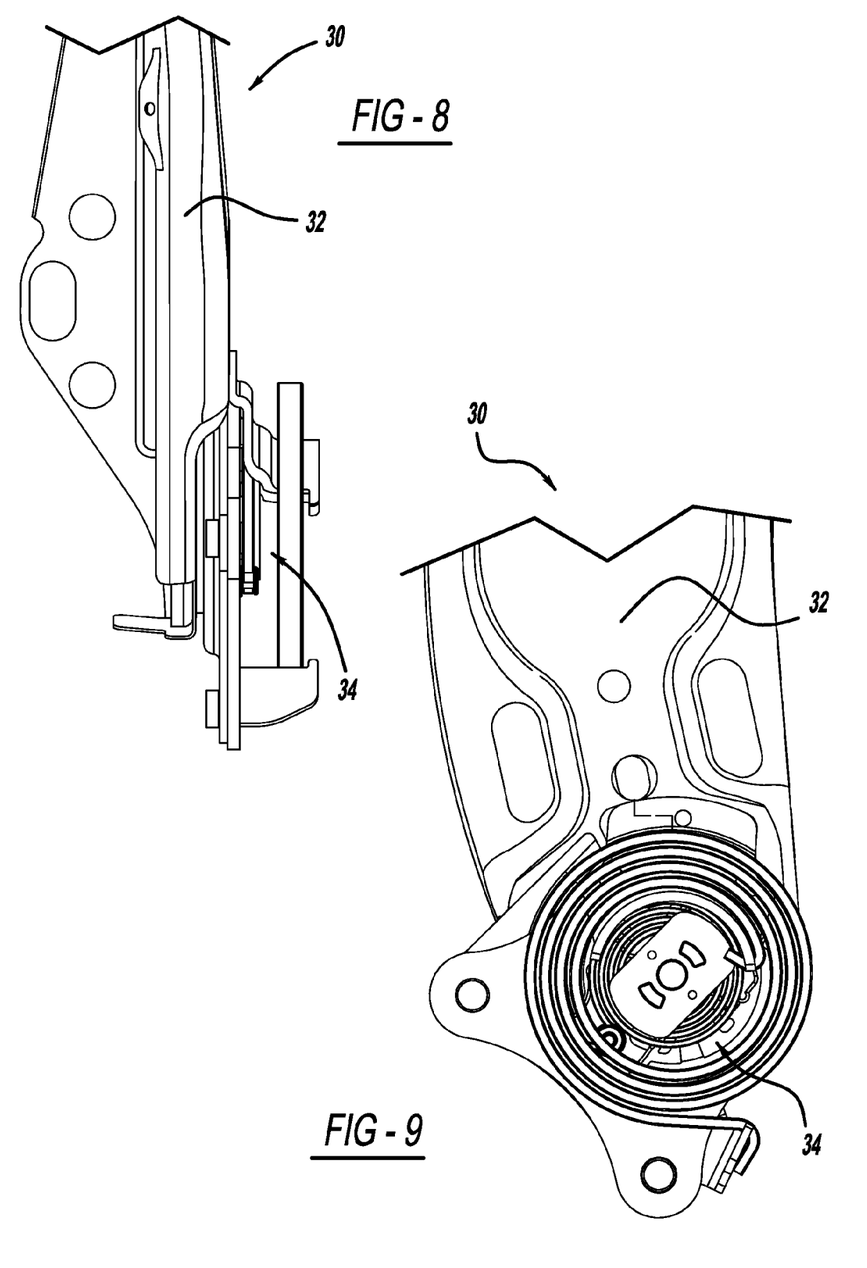
FIG. 8 is a partial view of the side, seat back frame member of FIG. 4 according to an exemplary embodiment.
FIG. 9 is a partial view of the side, seat back frame member of FIG. 6 according to an exemplary embodiment.
Figure 10:
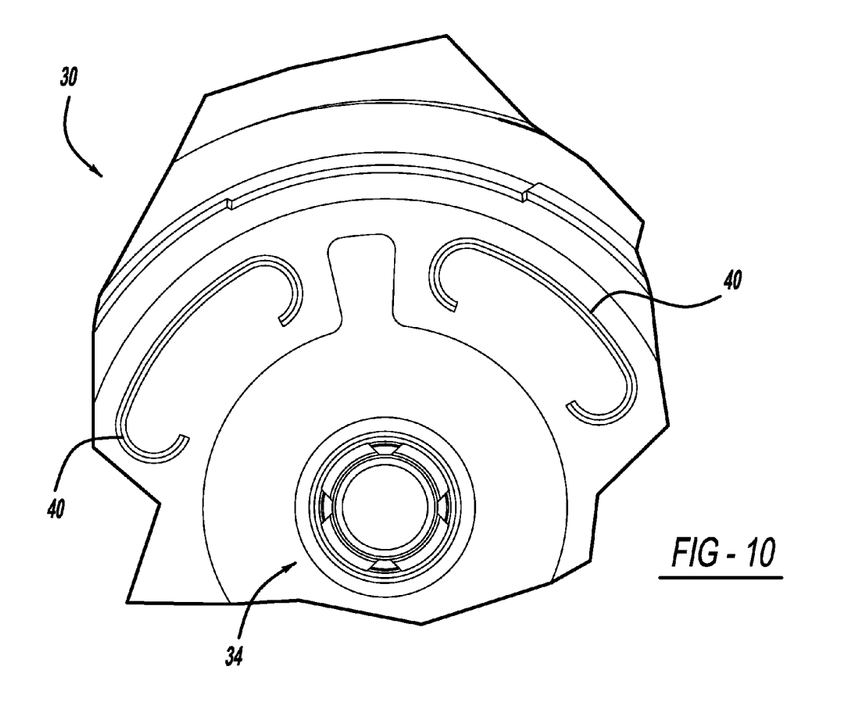
FIG. 10 is a detail, partial view of the side member of FIG. 7 detailing the laser welding pattern connecting the recliner mechanism to the side frame member according to an exemplary embodiment.

As best shown in FIGS. 3, 6 and 9, the recliner mechanism 34 is disclosed as a round heart-type recliner mechanism as is generally known in the vehicle seat applications. The round heart-type recliner mechanism 34 has a base plate 36 to be secured to the seat base 24 and a moving plate (or tooth) 38 shown secured to the side frame structural member 32. As best shown in FIGS. 4, 7 and 10, the recliner mechanism 34 is welded (albeit indirectly as explained below) to the side frame structural member using a laser welding process utilizing a C-shaped (also known as a staple) laser weld pattern 40. In particular, four, evenly and angularly spaced, C-shaped welds 40 are provided. It should be understood that other shapes of laser welding may be used and fewer or more welds may be utilized.

Figure 11:
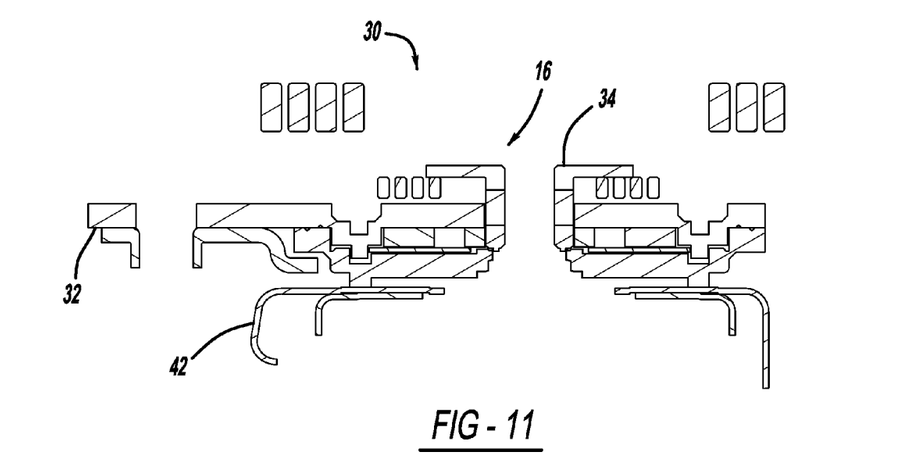
FIG. 11 is a partial, cross-section elevation view of the side frame member and recliner mechanism connection and reinforcement member of the side frame member shown in FIG. 9 according to an exemplary embodiment.

FIGS. 4, 7 and 10 show alternate, inboard side views of the side seat frame member 30. As best shown in FIG. 7, the side seat frame member 30 further includes a stiffening insert member 42 used in connecting the round heart-type recliner mechanism with the side frame structural member 32. The insert member 42 is generally a planar member that fits within the inboard side of the side frame structural member 32 and has a first, upper end having a generally square end and a second, lower end having a generally rounded shape complementary with the outline of the round heart-type recliner mechanism 34. The stiffening, insert member 42 further includes a pair of laterally located, extension flanges 44 extending in a direction substantially perpendicular to the general planar portion and from the first, upper end toward the second, lower end and to at least a point below the upper C-shaped, laser weld seam 46. It has been determined that the laterally located, extension flanges need not extend beyond the upper C-shaped laser weld seams since beyond about that location, the laterally located, extension flanges provide very limited stiffening to the side frame structural member 32. FIG. 11 shows a cross-section further detailing the connection of the stiffening insert member 42, the round heart-type recliner mechanism 34 and the side frame structural member 32.

Utilizing the stiffening insert member 42 in connecting the round heart-type recliner mechanism 34 and the side frame structural member 32 as disclosed makes it possible to have a sufficiently high-strength connection between the round heart-type recliner mechanism 34 and the side frame structural member 32 without having to further thicken the entire side frame structural member 32 and thereby having added, unnecessary mass. The stiffening insert member 42 may alternatively also include stiffening projections 48 extending inboard as an upset in the general planar area such as shown in FIGS. 4 and 7. The stiffening projections 48 further extend from a location proximate the first, upper end to a location above the connection area of the C-shaped, laser welds 40. Two stiffening projections 48 are shown located laterally from a general centerline of the stiffening insert member 42.

Figure 12:
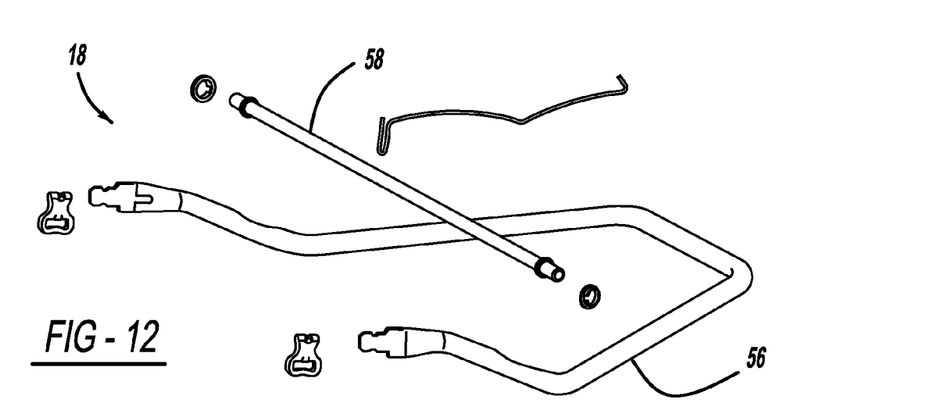
FIG. 12 is an exploded, perspective view of a vehicle seat track actuator according to an exemplary embodiment.

Referring now to FIGS. 12 through 21 and in particular to FIG. 12, a known actuator (or release system) 18 for use with a seat track assembly 28 to support the vehicle seat 12 is shown. The actuator 18 operates a latch mechanism 20 to unlock the latch mechanism 20 and release the movable track member 50 to allow it to move with respect to a base (typically a second track member) 52. When the actuator 18 is released, typically a biasing member (such as a spring) 54 in the latch mechanism 20, forces the latch mechanism 20 to reengage and lock the movable track member 50 with respect to the base 52. The actuator 18 of FIG. 12 includes a pivotable bar 56 (generally referred to as a towel bar in a vehicle seat application) having a generally U-shaped configuration including contours for providing installation in the vehicle seat 12 and track assembly 28. The actuator 18 includes a cross member 58 having a round, rod shape that is coupled to the sides or legs of the bar 56 and then inserted in the track members 50, 52 to pivot the towel bar 56. The cross member 58 is typically a stiff, metallic material and takes up space underneath the vehicle seat 12.

Figure 13:
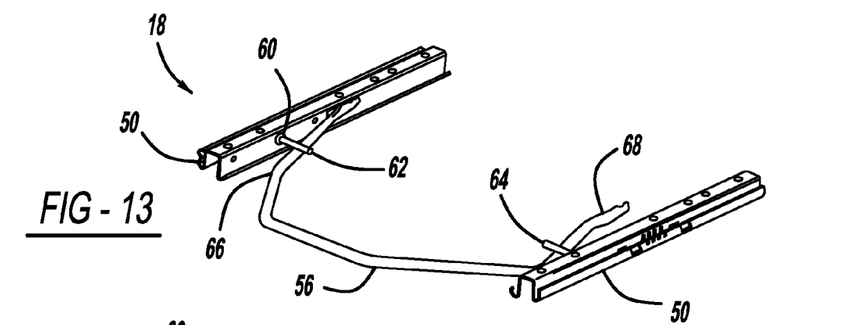
FIG. 13 is a perspective view of a vehicle seat track actuator according to an exemplary embodiment.
Figure 14:
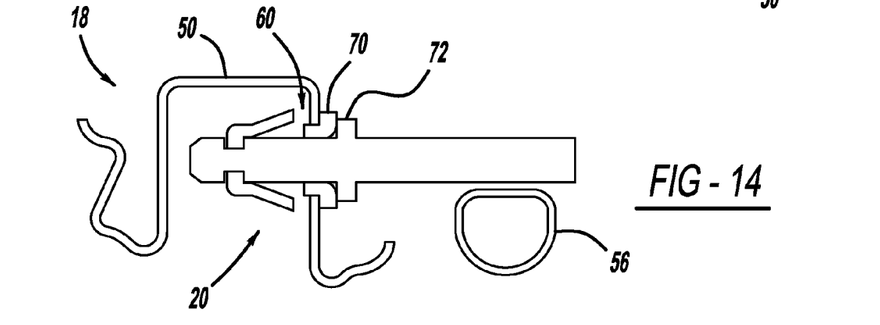
FIG. 14 is a partial, cross-section view of the vehicle seat track actuator according to an exemplary embodiment of FIG. 13.

FIGS. 13 and 14 show an actuator 18 for use with a seat track assembly 28 to support the vehicle seat 12 according to one exemplary embodiment. The actuator 18 is designed for operating a latch mechanism 20 to unlock the latch mechanism 20 and release the movable track member 50 to allow it to move with respect to a base 52. The actuator 18 is movable from a latch position to an unlatched position against the force of a biasing member 54 such as a spring in the latch mechanism 20 or other force generating mechanism. Similar to FIG. 12, the latch mechanism 20 locks the movable track member 50 with respect to the base or stationary track member 52. The track assembly 28 has first and second rail members 50, 52 and typically the vehicle seat 12 is supported on the movable track member 50. The actuator 18 includes a bar (or towel bar) 56 having a generally U-shaped configuration including contours for providing installation in the vehicle seat 12 and track assembly 28. The bar 56 of the actuator 18 is pivoted with respect to the seat track assembly 28 in a hole 60 in the movable track member 50. The bar 56 of the actuator 18 includes first and second pivot pins 62, 64 located on the first and second sides 66, 68 of the U-shaped bar 56 for insertion in the holes 60 in the respective track rail members 50. The first and second pivot pin 62, 64 each include a connector or bushing 70 located close to their distal ends that attach the pivot pins 62, 64 to the hole 60 in the track rail members 50 and thereby provide a pivot location and a connector 70 for securing the bar 56 to the track assembly 28.

Figure 15:
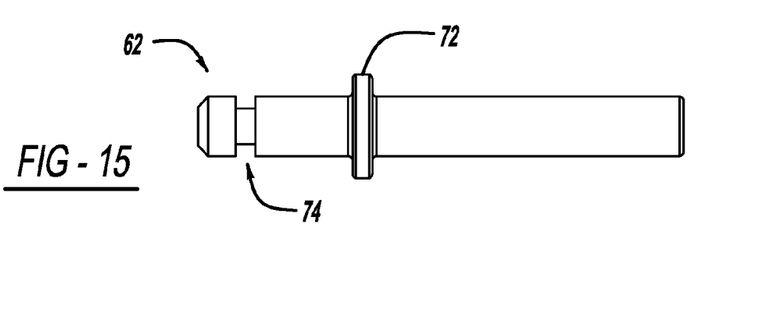
FIG. 15 is a side elevation view of a pivot pin of the vehicle seat track actuator according to an exemplary embodiment of FIGS. 13 and 14.
Figures 16, 17, 18:
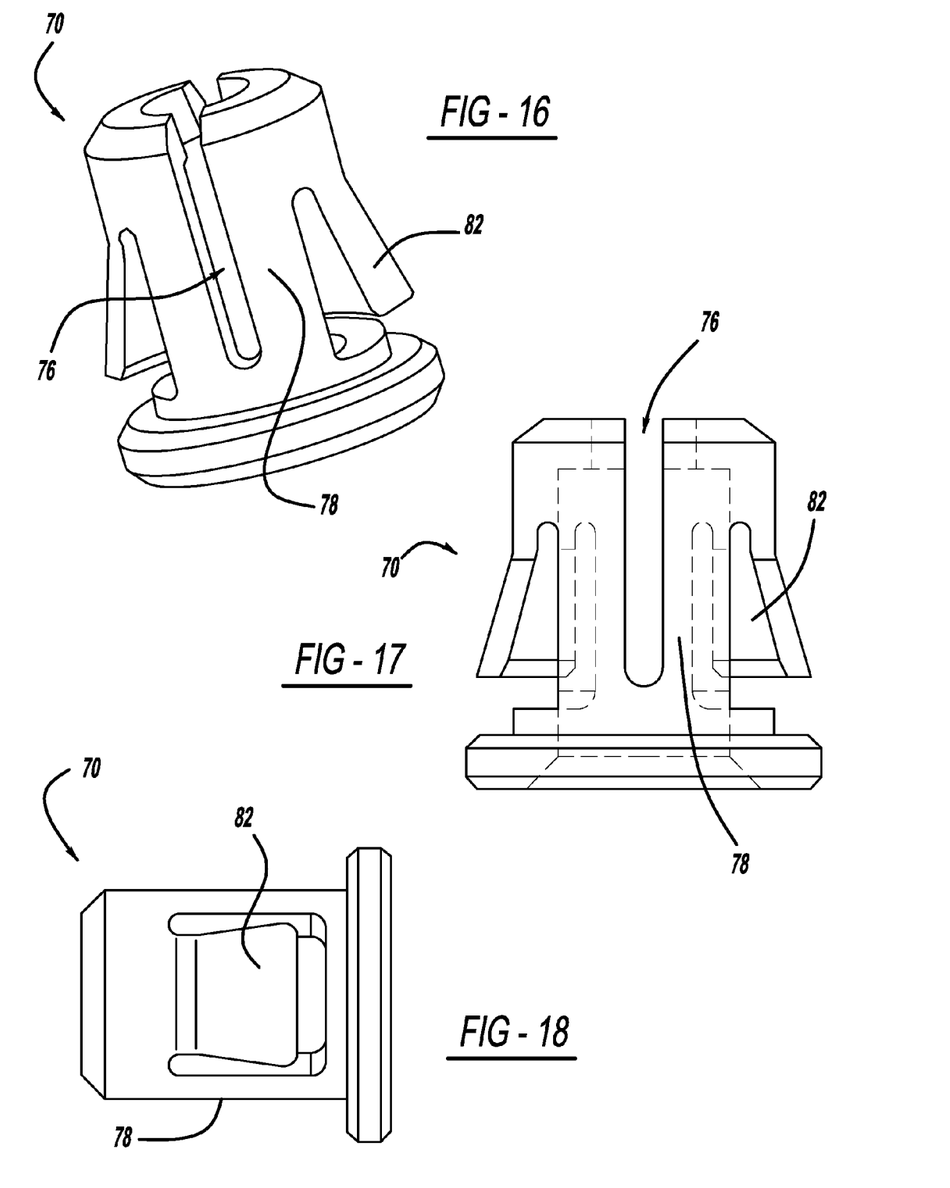
FIG. 16 is a perspective view of a connector used in the vehicle seat track actuator according to an exemplary embodiment of FIGS. 13 through 15.
FIG. 17 is a side view of the connector of the exemplary embodiment of FIG. 16.
FIG. 18 is a second, side view of the connector of the exemplary embodiment of FIG. 16.
Figures 19, 20:
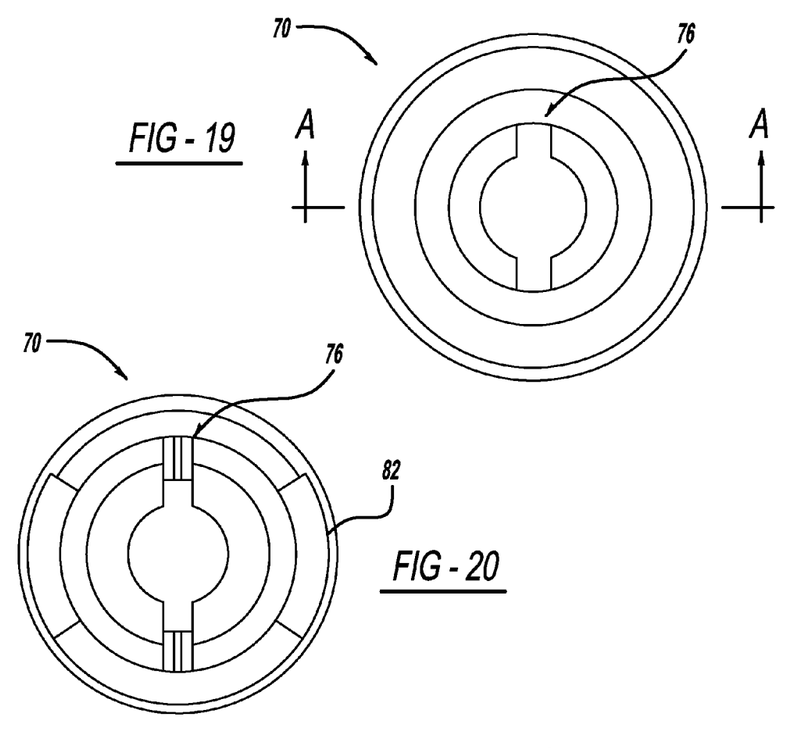
FIG. 19 is an end view of the connector of the exemplary embodiment of FIG. 16.
FIG. 20 is a second end view of the connector of the exemplary embodiments of FIG. 16 taken in the direction of the arrow B in FIG. 18.
Figure 21:
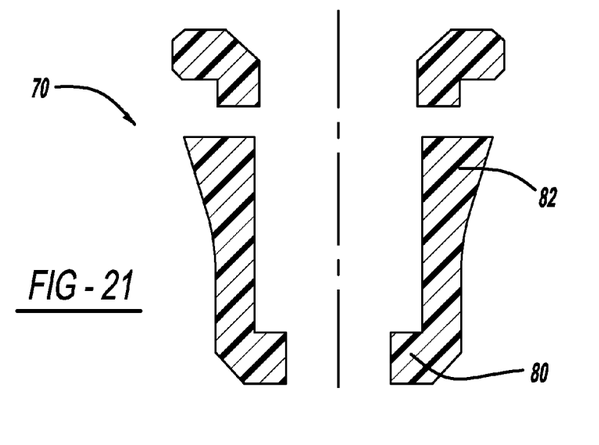
FIG. 21 is a partial, cross-section view of the connector of the exemplary embodiment of FIG. 16 taken in the direction of arrow A in FIG. 19.

FIG. 15 shows the pivot pin 62, 64 of the bar 56 of the actuator 18 of the vehicle seat 12. The pivot pin 62, 64 is a generally cylindrically-shaped member having a first circumferential extension member (or collar) 72 located in a central region and first circumferential groove 74 located at a distanced spaced from circumferential extension member 72 and close to the one end of the pivot pin 62, 64 inserted into the hole 60 in the movable track 50. The pivot pin 62, 64 is attached to the bar 56 at a second location spaced from the circumferential extension member 72. The connector 70 attaches the pivot pin 62 to the track rail member 50.

FIGS. 16 through 21 show the connector 70 used to attach the pivot pin 62, 64 to the track rail member 50. The connector 70 is a generally cylindrical bushing member and includes a first pair of oppositely located grooves 76 extending from a first end of connector 70 along the wall of the body portion of the cylinder 78. The connector 70 is inserted into at least one hole 60 of at least one track rail member 50 (this allows the connectors 70 to be shipped with the rail assemblies). The connector or 70 further includes a first pair of displaceable extension member (or wings) 82 that protrude outward and can be flexed inward and allow the pivot pin 62, 64 and connector 70 to be inserted into the hole 60 in the track rail member 50 and to thereby be connected (or snapped into) the track rail member 50. The displaceable extension members 82 expand outward once the connector 70 is inserted into the hole 60 in the track rail member 50 to prevent the connector 70 from detaching from the track rail member 50. The one end of the pivot pin 62, 64 is inserted in the connector 70 and the grooves 76 allow the body portion of the cylinder 78 to flex outward over the end of the pivot pin 62, 64 until the end reaches the groove 74 of the pivot pin 62, 64 and an inwardly extending lip 80 in the one end of the connector 70 is located in the groove 74. The connector 70 traps the pivot pin member 62, 64 to the track rail assembly 28 when a force is applied to the actuator 18 to unlock the latch mechanism 20.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The construction and arrangement of the elements of the improved seat back frame member 14 and recliner mechanism connection 16 and an improved vehicle seat track actuator mechanism 18 shown is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, the while improved seat back frame member 14 and recliner mechanism connection 16 and the improved vehicle seat track actuator mechanism 18 described herein are shown as being used in combination with a vehicle seat 12, such improved seat back frame member 14 and recliner mechanism connection 16 and an improved vehicle seat track actuator mechanism 18 may also be suitable for use with track assemblies used in other seat applications. Further, elements shown as integrally formed may be constructed of multiple parts or elements, the position of elements may be reversed or otherwise varied, and the nature or number of discrete elements or positions may be altered or varied. It should be noted that the elements and/or assemblies of the improved seat back frame member 14 and recliner mechanism connection 16 and an improved vehicle seat track actuator mechanism 18 may be constructed from any of a wide variety of materials that provide sufficient strength or durability in any of a wide variety of colors, combinations and suitable materials. Other substitutions, modifications, changes and omissions may be made in the design, operating conditions and arrangement of the preferred and other exemplary embodiments without departing from the scope of the present disclosure which is limited only by the understanding of a person of ordinary skill in the art.

What is claimed is:

1. A seat frame for use in a seat, the seat frame comprising:
 a first side member having a first surface which is an outboard side and a second surface which is an inboard side, the first side member having an end;
 a recliner mechanism having a first side for coupling to the first side member;
 an insert member having a first surface which is an outboard side and a second surface which is an inboard side, the insert member having a first upper end and a second lower end, the insert member for coupling to the second surface of the first side member; and
 wherein the insert member, the first side member and the recliner mechanism are welded together at a first weld location and the insert member and the first side member only are welded together at a second weld location,
 wherein the insert member includes a pair of laterally located extension flanges extending substantially perpendicularly from a generally planar portion of the insert member on the inboard side of the insert member, and
 wherein the insert member further includes two stiffening projections extending on the inboard side of the insert member from a location proximate the first upper end to a location proximate the first weld location.

2. The seat frame of claim 1 wherein the insert member includes the generally planar portion and the second end of the insert member is aligned with the end of the first side member.

3. The seat frame of claim 2 wherein the first end of the insert member is a generally square-shaped upper end and the second end is a generally round-shaped lower end aligned with the recliner mechanism.

4. The seat frame of claim 1 wherein the recliner mechanism is coupled to the first side member using four laser welds that are evenly and angularly spaced around the perimeter of the round-shaped recliner mechanism.

5. The seat frame of claim 1 further comprising a seat tracks assembly for providing slidable adjustment of the seat.

6. The seat frame of claim 5 wherein the seat tracks assembly includes a latch mechanism for locking the seat.

7. The seat frame of claim 6 further comprising an actuator for unlocking the latch mechanism.

8. The seat frame of claim 7 wherein the actuator includes a bar having a first end and a second end, the first and second ends each having a pivot pin coupled thereto and each pivot pin being inserted into a track of the seat tracks assembly.

9. The seat frame of claim 8 wherein the each pivot pin includes a collar and a groove located at their distal ends for fastening connectors thereon.

10. The seat frame of claim 9 further comprising a pair of connectors, each connector for coupling a pivot pin to the track, each connector including a groove to enable the connector to flex outward over the distal end of the pivot pin and engage the collar of the pivot pin to thereby secure each connector, pivot pin and the actuator in position on the tracks assembly.

11. The seat frame of claim 10 wherein each connector further includes an inwardly extending lip that fits into the groove of the pivot pin to further secure the connectors in position and secure the first and second pivot pins to the seat tracks assembly.

* * * * *